US006983994B2

(12) United States Patent
Pino

(10) Patent No.: US 6,983,994 B2
(45) Date of Patent: Jan. 10, 2006

(54) DEVICE FOR SENDING DOWN SEAT BACKRESTS IN VEHICLES

(75) Inventor: Nicola Pino, San Leucio (IT)

(73) Assignee: Proma S.r.l., San Nicola la Strada (IT)

( * ) Notice: Subject to any disclaimer, the term of this patent is extended or adjusted under 35 U.S.C. 154(b) by 0 days.

(21) Appl. No.: 11/015,262

(22) Filed: Dec. 17, 2004

(65) Prior Publication Data

US 2005/0146189 A1    Jul. 7, 2005

(30) Foreign Application Priority Data

Dec. 17, 2004  (IT)  .............................. 2003 001030

(51) Int. Cl.
*B60N 2/02*   (2006.01)
(52) U.S. Cl. ................................................ 297/378.12
(58) Field of Classification Search ........... 297/378.12, 297/378.1
See application file for complete search history.

(56) References Cited

U.S. PATENT DOCUMENTS

| | | | | |
|---|---|---|---|---|
| 3,966,253 A | | 6/1976 | Berghof et al. | |
| 4,700,989 A | * | 10/1987 | Ercilla | ......................... 297/331 |
| 5,393,116 A | * | 2/1995 | Bolsworth et al. | ........ 296/65.03 |
| 5,558,403 A | * | 9/1996 | Hammoud et al. | .... 297/378.12 |
| 5,718,481 A | * | 2/1998 | Robinson | ..................... 297/367 |
| 6,752,461 B2 | * | 6/2004 | Hamelin | ................ 297/378.12 |
| 6,832,815 B2 | * | 12/2004 | O'Connor | .............. 297/378.12 |

\* cited by examiner

*Primary Examiner*—Milton Nelson, Jr.
(74) *Attorney, Agent, or Firm*—Merchant & Gould P.C.

(57) ABSTRACT

Described herein is a device for sending down seat backrests in vehicles. The backrests are manually mobile between two operative positions. The device is provided with: an anchoring plate and a supporting plate hinged to one another and fixed, respectively, to a seat-cushion frame and to the backrest; and a blocking plate, set between the anchoring plate and the supporting plate. The blocking plate is manually mobile against the elastic action of a spring fixed to the anchoring plate and is provided, together with the anchoring plate itself, with respective guide slots engaged by a pin fixed to the supporting plate and mobile between two blocking seats made at the opposite ends of the guide slot of the blocking plate, in positions staggered with respect to the guide slot of the blocking plate itself.

8 Claims, 2 Drawing Sheets

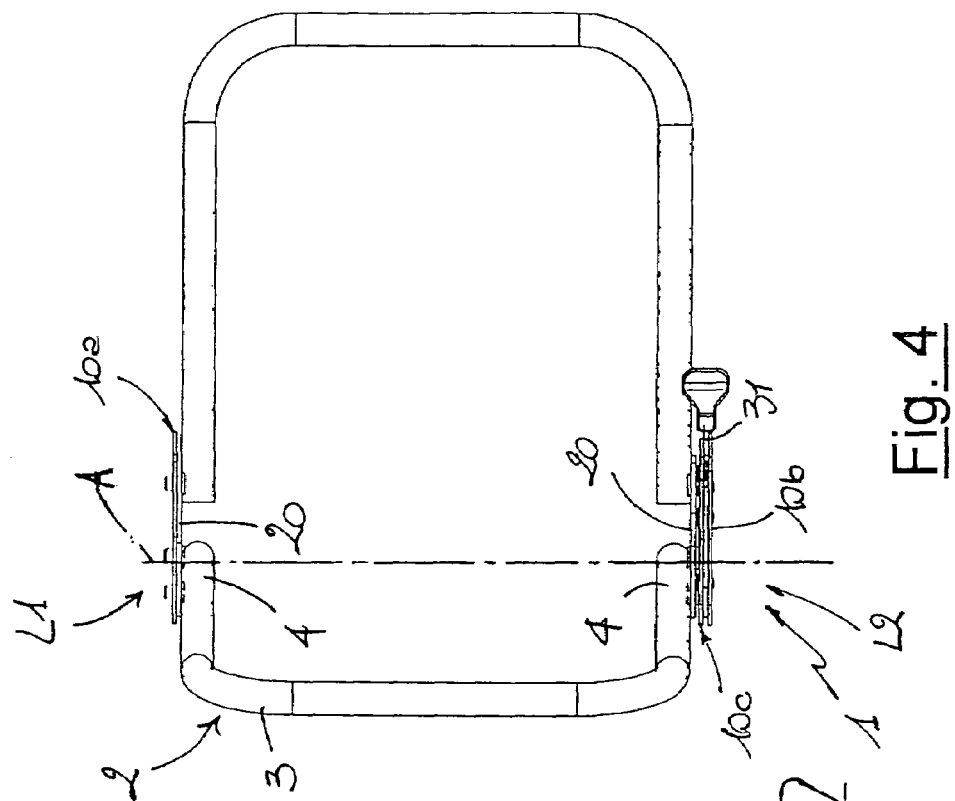
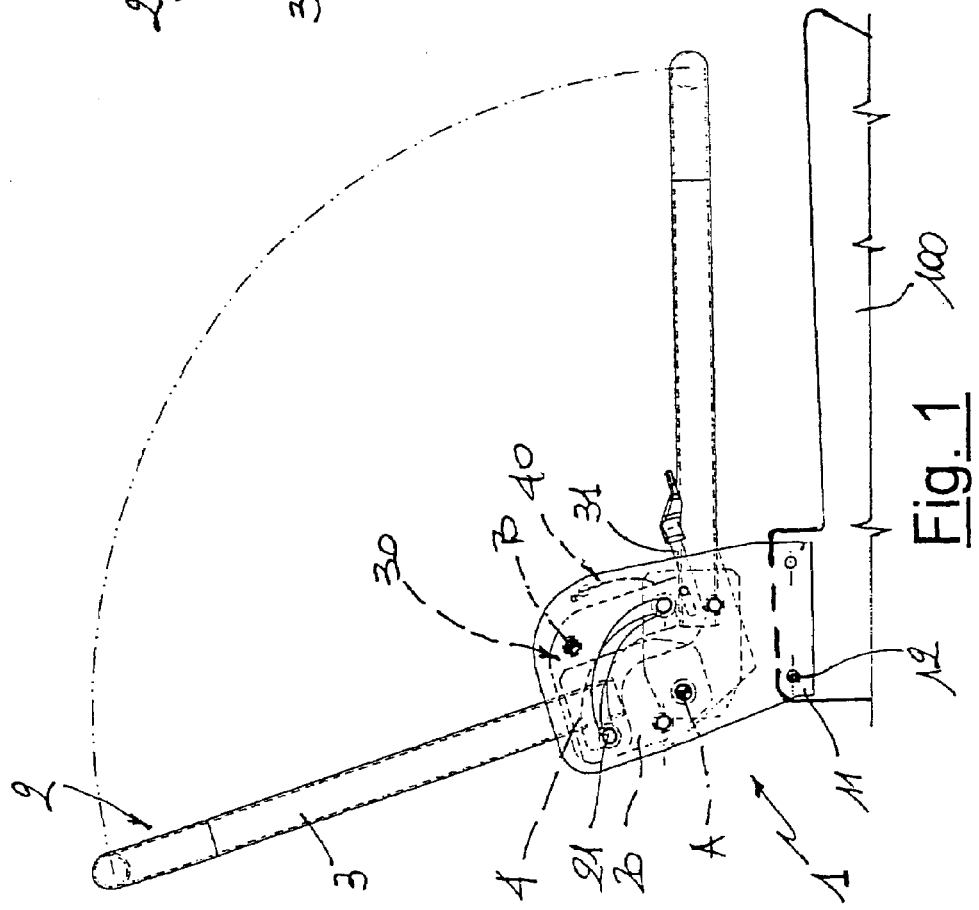

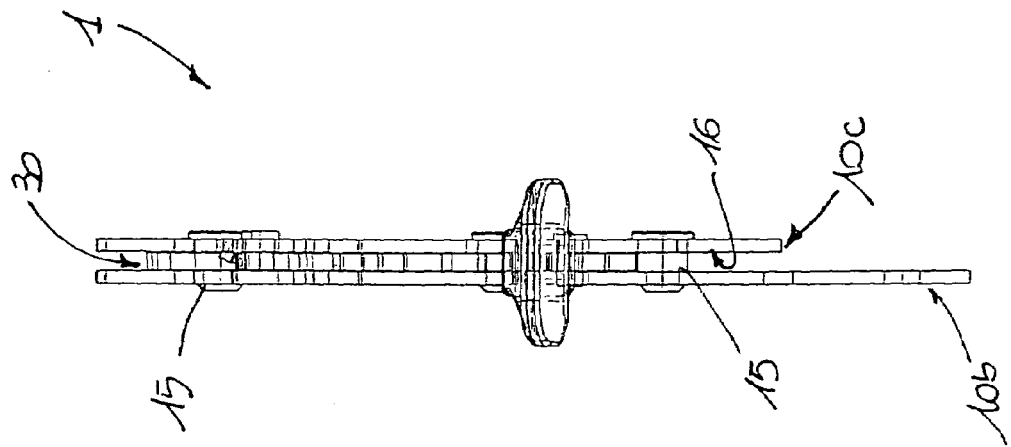
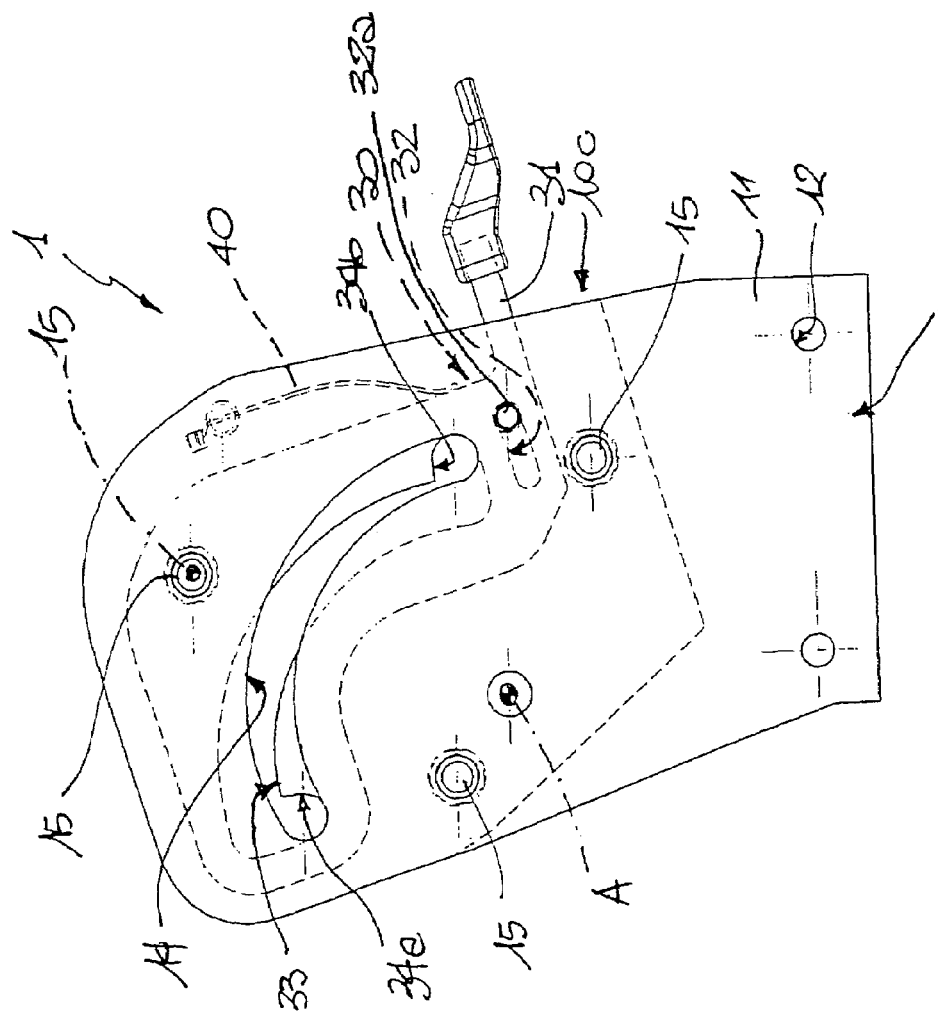

DEVICE FOR SENDING DOWN SEAT BACKRESTS IN VEHICLES

BACKGROUND OF THE INVENTION

1. Field of the Invention

The present invention relates to a device for sending down seat backrests in vehicles.

2. Description of the Prior Art

In the field of vehicles in general, and of vehicles for transporting passengers in particular, devices for sending down seat backrests are known, which are designed to enable the seats themselves to be set in a lowered position, in which the backrests lie on top of a respective seat, and which comprise, as is for example illustrated in the U.S. Pat. No. 3,966,253, two anchoring plates fixed to the vehicle or else to the seat itself, two supporting plates connected to a frame of the backrest itself and hinged to the anchoring plates, and a moving and blocking device, which is set between at least one anchoring plate and the corresponding supporting plate for moving the backrest between an upright position and the lowered position and for blocking the backrest itself in the upright position.

In the U.S. patent mentioned above, the moving and blocking device comprises an actuation lever and a series of return plates, which are connected to one another and to the actuation lever itself to constrain the supporting plate to the anchoring plate and to release, under the action of the lever, the supporting plate from the anchoring plate, so enabling automatic moving of the backrest as a result of the elastic action of the springs.

The devices for sending down seat backrests of the type described above present a number of drawbacks basically due to their structure, which not only presents a high number of somewhat complex components and requires long production times, but also leads to the onset of mechanical play that can be experienced as unpleasant vibrations of the backrest.

SUMMARY OF THE INVENTION

The purpose of the present invention is to provide a device for sending down seat backrests in vehicles which will enable the drawbacks described above to be overcome in a simple and economically advantageous way.

According to the present invention, a device for sending down seat backrests in vehicles is provided, the backrests being manually mobile between two operative positions, and the device comprising: at least one anchoring plate fixed to a seat-cushion frame provided with a first guide slot; a supporting plate hinged to the anchoring plate and provided with a pin engaged in the first guide slot, the supporting plate being connected to a frame of the backrest; and blocking means fixed on the supporting plate for blocking the backrest itself at least in one first operative position of said two operative positions. The device for sending down seat backrests is characterized in that the blocking means comprise a second guide slot, which is engaged by the pin and can be superimposed on the first guide slot to enable free movement of the backrest, and a first blocking seat, which is set at a first end of the second guide slot in a position staggered with respect to the second guide slot itself and can be engaged by the pin with the backrest set in said first operative position.

BRIEF DESCRIPTION OF THE DRAWINGS

The invention will now be described with reference to the annexed plate of drawings, which illustrate a non-limiting example of embodiment thereof, and in which:

FIG. 1 is a side elevation of a preferred embodiment of a device for sending down seat backrests in vehicles made according to the present invention;

FIG. 2 is a view at an enlarged scale of a detail of FIG. 1;

FIG. 3 is a front elevation of the item represented in FIG. 2; and

FIG. 4 is a top plan view of the device for sending down seat backrests illustrated in FIG. 1.

DETAILED DESCRIPTION OF THE INVENTION

With reference to FIGS. 1 and 4, number 1 designates, as a whole, a device for sending down seat backrests 2 in vehicles.

The backrest 2 can be rotated manually about a horizontal axis of rotation A between a raised operative position and a lowered operative position, and comprises a tubular frame 3, which is substantially shaped like a U set upside down and has two terminal portions 4 and two supporting plates 20, which are set in a transverse direction with respect to the axis A and are welded to the two terminal portions 4.

The device 1 comprises three anchoring plates 10a, 10b, and 10c, which have a bottom base 11 provided with through holes 12 for anchorage to a seat-cushion frame 100 mounted on the vehicle and associated to the backrest 2, and each of which is further provided with a respective guide slot 14 having a semicircular shape centered on the axis A. Of the three plates 10a, 10b, and 10c, one plate, designated by 10a, is set by itself on one side L1 of the backrest 2, whereas two plates, designated by 10b and 10c, are set on a side L2 of the backrest 2 opposite to the side L1 and, as is illustrated in greater detail in FIG. 3, are assembled together by means of three spacers 15 arranged around the slot 14.

The three spacers 15 keep the two plates 10b and 10c facing one another and parallel to one another, with the corresponding slots 14 aligned with respect to one another, as well as at a given distance from one another so as to define a compartment 16 peripherally opened outwards.

According to one embodiment, which is not illustrated but may be readily inferred from what has been described above, and with the purpose of further reducing the costs of production of the device 1, the plate 10b can be directly integrated in the seat-cushion frame 100, or better still, in a side of the seat-cushion frame 100.

The two plates 20 are hinged to the corresponding plate 10a and 10b at the axis A and each is provided with a corresponding pin 21, which is set parallel to the axis A and is engaged so that it can slide in a transverse direction with respect to the axis A through the corresponding slots 14. In particular, the pin 21 of the side L2 is engaged in both of the slots 14 of the plates 10b and 10c.

Hinging of the plates 20 in the plates 10b and 10c and simultaneous engagement of the pins 21 in the slots 14 enables guided and controlled moving of the backrest 2 about the axis A between the raised operative position and the lowered operative position.

According to what is better illustrated in FIG. 2, the device 1 further comprises a blocking plate 30, which is set between the plates 10b and 10c and is mobile within the compartment 16 to co-operate with the plates 10b and 10c so as to block the backrest 2 in the two operative positions or at least in the raised operative position. In particular, the plate 30 is mounted so that it can turn about an axis B of oscillation parallel to the axis A and defined by the spacer 15 set on the opposite side of the slots 14 with respect to the base 11.

Finally, the device 1 comprises a control arm 31 fixed to the plate 30 for moving the plate 30 itself about the axis B, and a bending spring 40, which is carried by the plates 10*c* and 10*b* inside the compartment 16 and is set with a free end thereof up against the plate 30 so as to oppose any displacement of the plate 30 itself from a respective resting position, the purposes and functions of which will be described in greater detail in what follows.

According to what is illustrated in FIG. 2, the plate 30 comprises an oscillation slot 32, set in the proximity of the control arm 31, and a corresponding guide slot 33, which is also engaged by the pin 21 and can be superimposed on the guide slots 14 of the plates 10*b* and 10*c* to enable free movement of the backrest 2 between the two corresponding operative positions.

The slot 32 determines the maximum limits of oscillation of the plate 30 and is engaged by a pin 32*a*, which is fixed and set transverse to the plates 10*b* and 10*c* and is set parallel to the axis A.

Also the slot 33 has a semicircular shape identical to that of the slot 14 and is provided, at its respective opposite ends, with two blocking seats 34*a* and 34*b*, which are set in respective positions staggered with respect to the slot 33 and can be engaged by the pin 21 with the backrest 2 arranged in the corresponding operative positions.

In particular, the seats 34*a* and 34*b* are set on opposite sides of the slot 33 and, whereas the seat 34*b* extends in a direction substantially parallel to the slot 32, the seat 34*a* is instead oriented substantially perpendicular to the slot 32 itself.

The staggered position of the seats 34*a* and 34*b* with respect to the slot 33 and the combination of the movement of oscillation of the plate 30 about the axis B with the countering force exerted by the spring 40 precisely against the plate 30 cause the pin 31 to be completely blocked inside the seats 34*a* and 34*b* when the backrest 2 is set in any of its operative positions. In addition, the constructional simplicity of the plates 10*a*, 10*b*, 10*c*, 20, and 30 and the presence of the spring 40 prevent any vibration of the backrest 2 in so far as the staggering between the slots 33 and 14 not only brings about complete blocking of the pin 21 in the seals 34*a* and 34*b*, but also enables recovery of any play due to tolerances of fabrication or positioning.

In use, with the pin 21 set in the seat 34*a*, i.e., with the backrest 2 set in its raised operative position, it will be necessary to act manually on the lever 31 to displace the plate 30 from its own resting position so as to superimpose the slots 14 and 33 on one another.

At this point, it will be possible to send the backrest 2 down manually, causing the pin 21 to traverse both of the slots 14 and 33 until the pin 21 itself reaches a position corresponding to the seat 34*b*, inside which it will practically be pushed by the spring 40 which will produce a new misalignment of the slots 14 and 33.

A similar procedure must be followed to raise the backrest 2 from the lowered operative position to the raised operative position.

It is understood that the invention is not limited to the embodiment described and illustrated herein, which is to be considered merely as an example of embodiment of the device for sending down seat backrests in vehicles, it being instead possible for said device to undergo further modifications regarding shapes and arrangement of parts, and constructional and assembly details.

What is claimed is:

1. A folding assembly comprising:
   a vehicle seat backrest, wherein, the backrest is manually movable between a first operative position and a second operative position, and
   a device for folding the seat backrest comprising:
      at least one anchoring plate fixed to a seat-cushion frame provided with a first guide slot;
      a supporting plate hinged to the anchoring plate and provided with a pin engaged in the first guide slot, the supporting plate being connected to a frame of the backrest;
      and blocking means fixed on the supporting plate for blocking the backrest at least in the first operative position wherein the blocking means comprise a second guide slot, engaged by the pin and superimposable on the first guide slot to enable free movement of the backrest, and a first blocking seat, which is set at a first end of the second guide slot in a position staggered with respect to the second guide slot and engagable by the pin with the backrest set in said first operative position, wherein the blocking means comprise a second blocking seat set at a second end of the second guide slot opposite to said first end and in a position staggered with respect to the second guide slot, wherein the second blocking seat is engagable by the pin with the backrest set in the second operative position.

2. The assembly according to claim 1, wherein the device comprises at least two anchoring plates fixed to one another and to the seat-cushion frame and set at a distance apart from one another so as to define a compartment for said blocking means.

3. The assembly according to claim 1, wherein the second blocking seat is set on the opposite side of the second guide slot with respect to the first blocking seat.

4. The assembly according to claim 3, wherein the first guide slot and the second guide slot have respective semi-circular shapes superimposable on one another with the pin outside said blocking seats.

5. The assembly according to claim 4, wherein the blocking means comprise a blocking plate, parallel and hinged to the anchoring plate so as to oscillate selectively about an axis of oscillation from and towards a resting position; said second guide slot and said blocking seats being made through the blocking plate.

6. The assembly according to claim 5, wherein the blocking means comprise an elastic contrast element fixed to the anchoring plate and set in contact with the blocking plate so as to exert a force countering the oscillation of the blocking plate from the resting position.

7. The assembly according to claim 6, wherein the first guide slot has respective terminal portions superimposable on the blocking seats only with the blocking plate set in the resting position.

8. The assembly according to claim 7, wherein the blocking plate defines an oscillation slot designed to guide the oscillation of the blocking plate and is engaged by a further pin fixed to the anchoring plate.

* * * * *